(12) United States Patent
Nixon

(10) Patent No.: US 11,320,403 B2
(45) Date of Patent: May 3, 2022

(54) CABLE MANAGEMENT ASSEMBLY

(71) Applicant: Vertex Components Limited, Middlesborough (GB)

(72) Inventor: Jordan Nixon, Middlesborough (GB)

(73) Assignee: VERTEX COMPONENTS LIMITED, Yorkshire (GB)

( * ) Notice: Subject to any disclaimer, the term of this patent is extended or adjusted under 35 U.S.C. 154(b) by 0 days.

(21) Appl. No.: 16/623,490

(22) PCT Filed: Jun. 21, 2018

(86) PCT No.: PCT/GB2018/051731
§ 371 (c)(1),
(2) Date: Dec. 17, 2019

(87) PCT Pub. No.: WO2018/234809
PCT Pub. Date: Dec. 27, 2018

(65) Prior Publication Data
US 2020/0200714 A1  Jun. 25, 2020

(30) Foreign Application Priority Data

Jun. 21, 2017 (GB) .................................. 1709915

(51) Int. Cl.
*G01N 29/22* (2006.01)
*B65H 75/44* (2006.01)
*H02G 11/02* (2006.01)

(52) U.S. Cl.
CPC .......... *G01N 29/22* (2013.01); *B65H 75/4402* (2013.01); *H02G 11/02* (2013.01); *B65H 2701/34* (2013.01)

(58) Field of Classification Search
CPC ............ B65H 75/4402; B65H 2701/34; B65H 75/4431; B65H 75/446; G01N 29/22; H02G 11/02
See application file for complete search history.

(56) References Cited

U.S. PATENT DOCUMENTS

| 3,733,478 A | * | 5/1973 | Barker | F21V 27/005 |
| | | | | 362/387 |
| 3,821,496 A | * | 6/1974 | Malone | A61B 5/04 |
| | | | | 191/12.2 R |
| 4,834,103 A | * | 5/1989 | Heath | A61N 1/046 |
| | | | | 600/372 |
| 5,033,474 A | | 7/1991 | Varelis et al. | |

(Continued)

FOREIGN PATENT DOCUMENTS

DE          101 03 794          8/2002

*Primary Examiner* — William A. Rivera
(74) *Attorney, Agent, or Firm* — Woodard, Emhardt, Henry, Reeves & Wagner LLP

(57) ABSTRACT

The invention relates to a spool assembly for use to effectively manage cables and in particular cables for use as part of ultrasonic testing apparatus, The spool assembly allows the cables to be moved between a storage position in which at least part of the cables are located within the housing of the spool assembly and an extended position in which a greater portions of the cables is unwound and extended from the spool assembly. The spool assembly can be used in two modes of operation, a first mode to allow the cables to be wound onto the holder and a second mode in which the holder is biased to wind the cables into the storage position.

19 Claims, 19 Drawing Sheets

(56) References Cited

U.S. PATENT DOCUMENTS

| | | | | |
|---|---|---|---|---|
| 5,168,969 A | * | 12/1992 | Mayhew | H02G 11/02 |
| | | | | 191/12.2 R |
| 5,593,316 A | * | 1/1997 | Lyons | H01R 13/72 |
| | | | | 439/501 |
| 5,690,198 A | * | 11/1997 | Lohr | H02G 11/02 |
| | | | | 191/12.2 R |
| 5,913,487 A | * | 6/1999 | Leatherman | H02G 11/02 |
| | | | | 191/12.2 R |
| 6,077,108 A | * | 6/2000 | Lorscheider | B65H 75/44 |
| | | | | 439/501 |
| 6,179,238 B1 | * | 1/2001 | Phillipps | B65H 75/44 |
| | | | | 191/12.4 |
| 6,205,355 B1 | * | 3/2001 | Lomanto | A61B 5/04286 |
| | | | | 600/509 |
| 8,376,103 B1 | | 2/2013 | Sliger | |
| 10,130,276 B2 | * | 11/2018 | Lane | A61B 5/0402 |
| 10,729,402 B2 | * | 8/2020 | Al-Ali | A61B 5/024 |
| 2006/0028198 A1 | | 2/2006 | Hoopengarner | |
| 2010/0006685 A1 | | 1/2010 | Crucs et al. | |
| 2012/0312651 A1 | | 12/2012 | Kramer et al. | |
| 2013/0200198 A1 | * | 8/2013 | Partee | B65H 54/58 |
| | | | | 242/476.6 |
| 2013/0211210 A1 | * | 8/2013 | Freeman | A61B 5/303 |
| | | | | 600/301 |

* cited by examiner

CABLE MANAGEMENT ASSEMBLY

The invention to which this application relates to, is an assembly to allow the lead cables of apparatus to be efficiently stored when not in use whilst, at the same time, allowing the lead cables to be readily available to be extended from the apparatus when the same are required to be used during the operation of the apparatus. The invention is particularly, although not necessarily exclusively provided for operation with lead cables of the type which are provided to be used with ultrasonic test equipment.

The invention will now be described in association with this type of equipment but it should be appreciated that this is provided in an illustrative manner and not in a limiting manner.

Ultrasonic test equipment can be used in a number of different ways but generally is provided to allow the integrity of an assembly or a unitary member such as a section of pipeline to be tested. Regardless of the particular use it is often the case that the apparatus can be required to be used in the external environment and on occasion in difficult to access locations, relatively high risk locations for the user of the apparatus and/or in hazardous environments. The apparatus typically includes a base unit which includes a display, control means and at least some form of data processing means in order to allow feedback to be provided directly to the user of the apparatus, via the display and/or for the data to be transmitted to a remote location for further analysis. The base unit typically includes first and second lead cables which are provided with a plug at a first end to allow the same to be connected to the base unit and, at the opposing end, the lead cable is provided with a probe which is presented to the item which is to be tested. In order for the apparatus to be used in a greater number of locations the lead cables are typically provided of a significant length so as to allow the probes located at the free ends of the lead cables to be moved to a position of use which may be inaccessible to the base unit. While this undoubtedly is of advantage in the use of the apparatus as a whole, the lead cables themselves can represent a potential hazard if the same become snagged, there is a risk that the lead cables may be damaged and hence render the apparatus inoperable and/or are generally a nuisance when the apparatus is not in use as the lead cables can be left loose, become tangled or knotted and generally be untidy. These problems have been known for many years but have been tolerated due to the need to have the relatively long lead cables in order to increase the overall utility of the apparatus.

The aim of the present invention is therefore to provide an assembly which allows the lead cable to be retained in a relatively neat condition and at the same time reduce the risk of damage being caused to the same and/or reduce the risk of the lead cable and probe causing damage to the apparatus to which the same are connected and/or injury to the user of the apparatus.

In a first aspect of the invention there is provided electrical monitoring apparatus, said apparatus including a base unit and at least first and second lead cables connected thereto to provide data from sensors at one end of the cables to the base unit via connectors at the opposing ends of the cables and wherein the apparatus includes, or is connectable to, a spool assembly in which the said lead cables are at least partially wound for storage and extended therefrom as required for use of the apparatus.

In one embodiment the assembly includes a holder about which the lead cables are wound.

In one embodiment the spool assembly has a first mode of operation in which the lead cable can be wound with the assembly and a second mode of operation in which the lead cables can be selectively extended from the assembly and then retracted into the assembly when the extension is no longer required.

In one embodiment in the second mode of operation the lead cables are biased to retract into the assembly when any retaining force is released such that the default condition is for the lead cables to be wound in the spool assembly.

In one embodiment the mode of the assembly is selected by the user of the assembly by altering the condition of actuation means. Typically the first mode is used at the time of locating the lead cables with the assembly prior to use of the lead cables with the monitoring apparatus.

Typically each of the lead cables includes a connector, typically the 'male' end for the cables to be connected with the 'female' socket in the base unit. Typically the assembly includes locating means in the form of a bracket with which the said connectors and/or lead cables engage so as to present the said connectors at the appropriate location so as to engage with the particular base unit with which the same are to be used.

In one embodiment the said location means is adjustable so as to allow the spacing between the said lead cables connectors to be adjusted by the user to take into account different spacings which may be required for connection to the base unit of different manufacturers.

In one embodiment the assembly is provided as an integral part of the base unit. Alternatively the assembly is provided with engagement means which allow the assembly to be selectively fitted to the base unit to allow the assembly to be used therewith.

In a further aspect of the invention there is provided a spool assembly for one or more lead cables to be located therein, said assembly allowing the lead cables to be partially wound therein and extended therefrom as required for use and wherein the spool assembly is operable in a first mode to allow the one or more cables to be wound onto a holder of the assembly and a second mode in which the one or more cables are biased to at least partially retract into the assembly.

In one embodiment there is provided a user actuable locking switch which allows the spool assembly to be selectively moved between the two modes of operation by selective operation thereof.

Specific embodiments of the invention are now described with respect to the accompanying drawings wherein FIGS. 1,2 & 9 show perspective views of the assembly in accordance with one embodiment of the invention;

Figure 1:
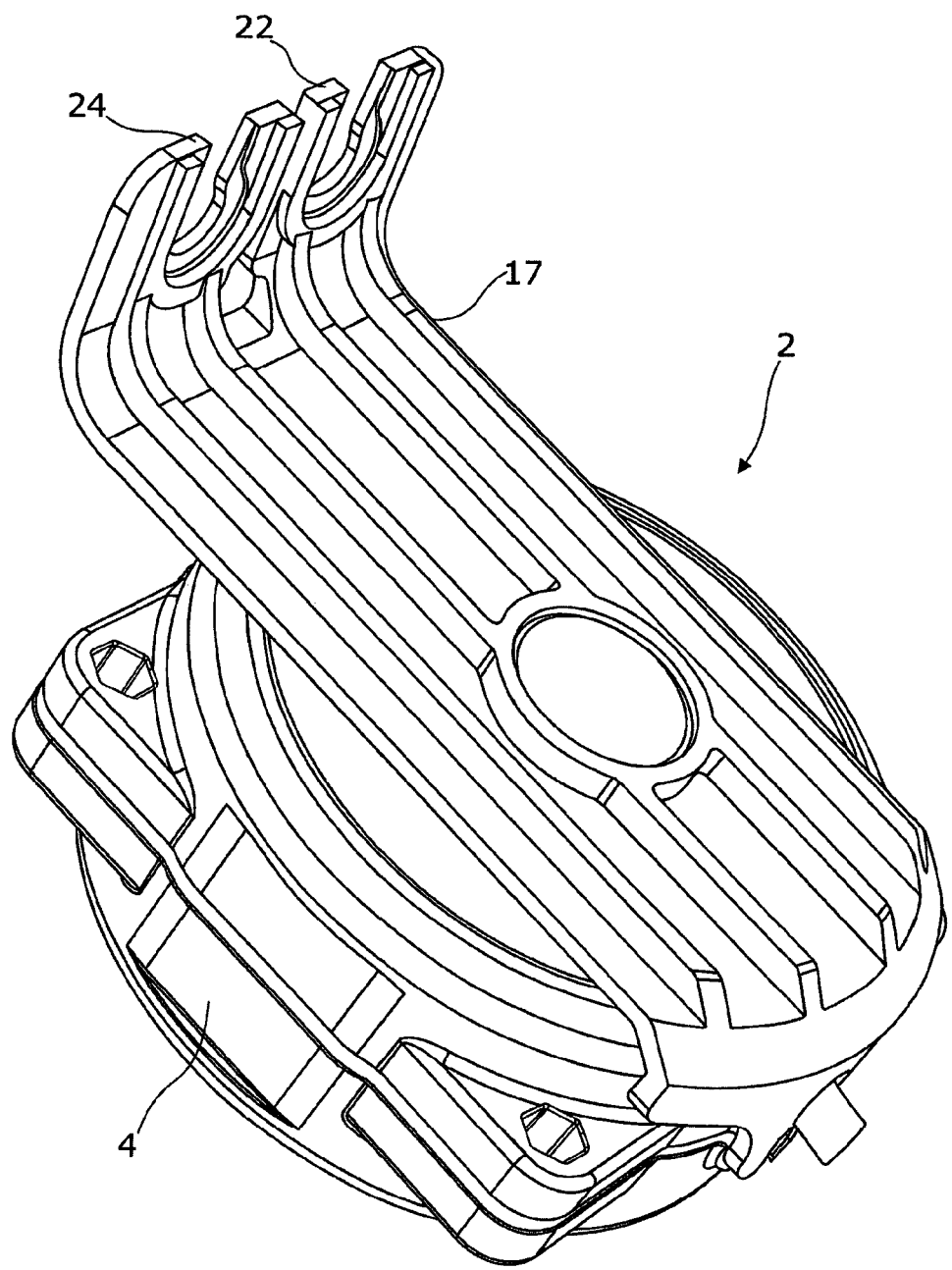
Figure 2:
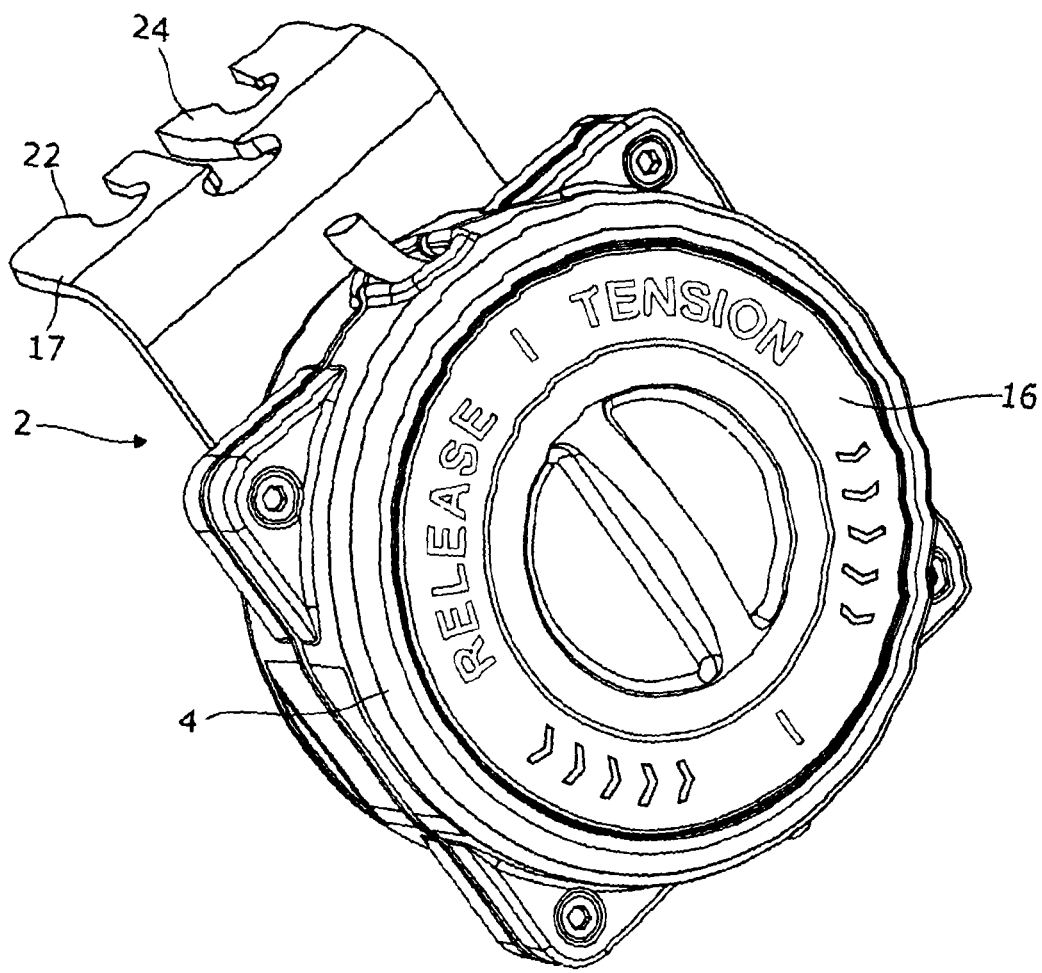
Figure 3:
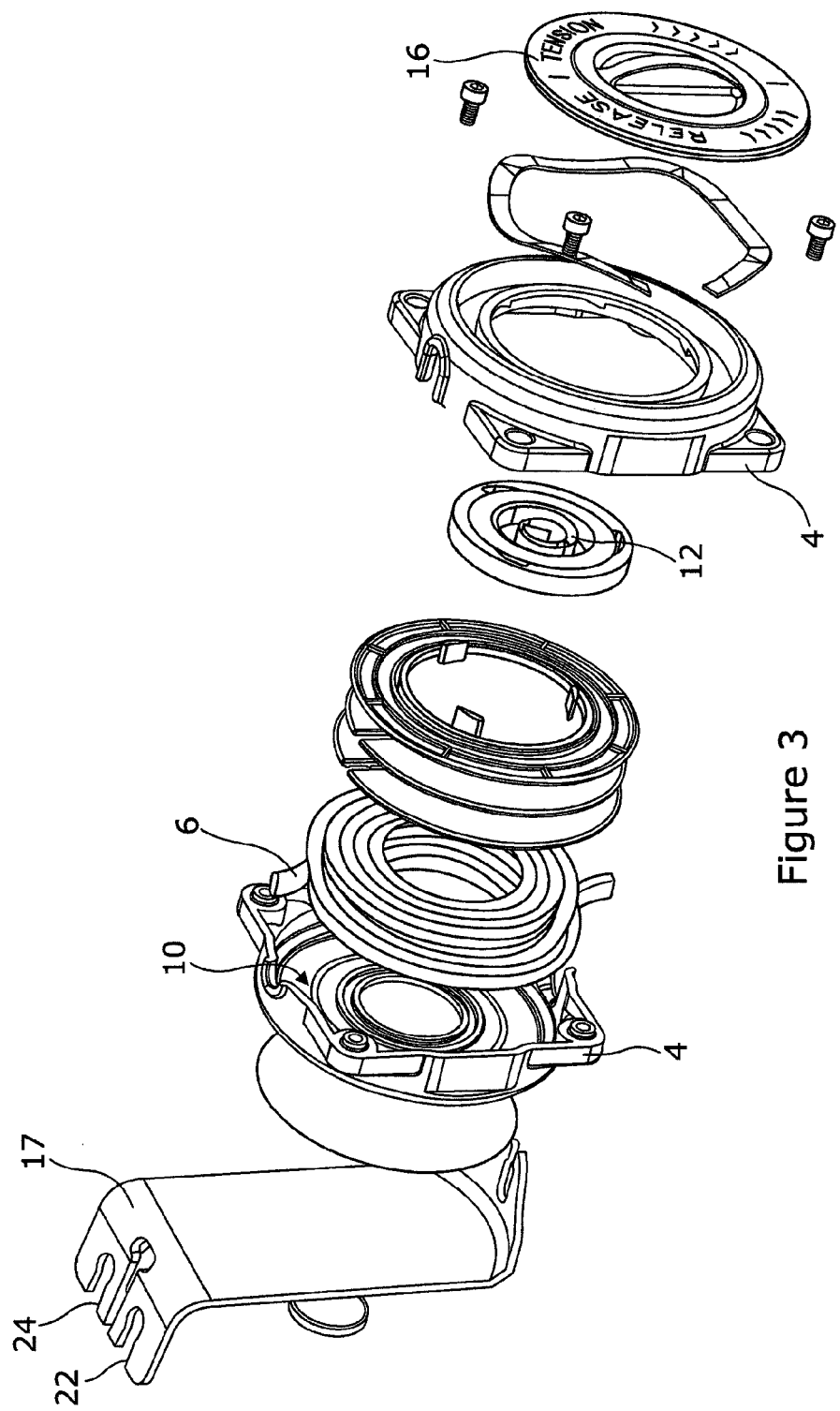
FIGS. 3 and 4 show exploded diagrams of the components.
Figure 4:
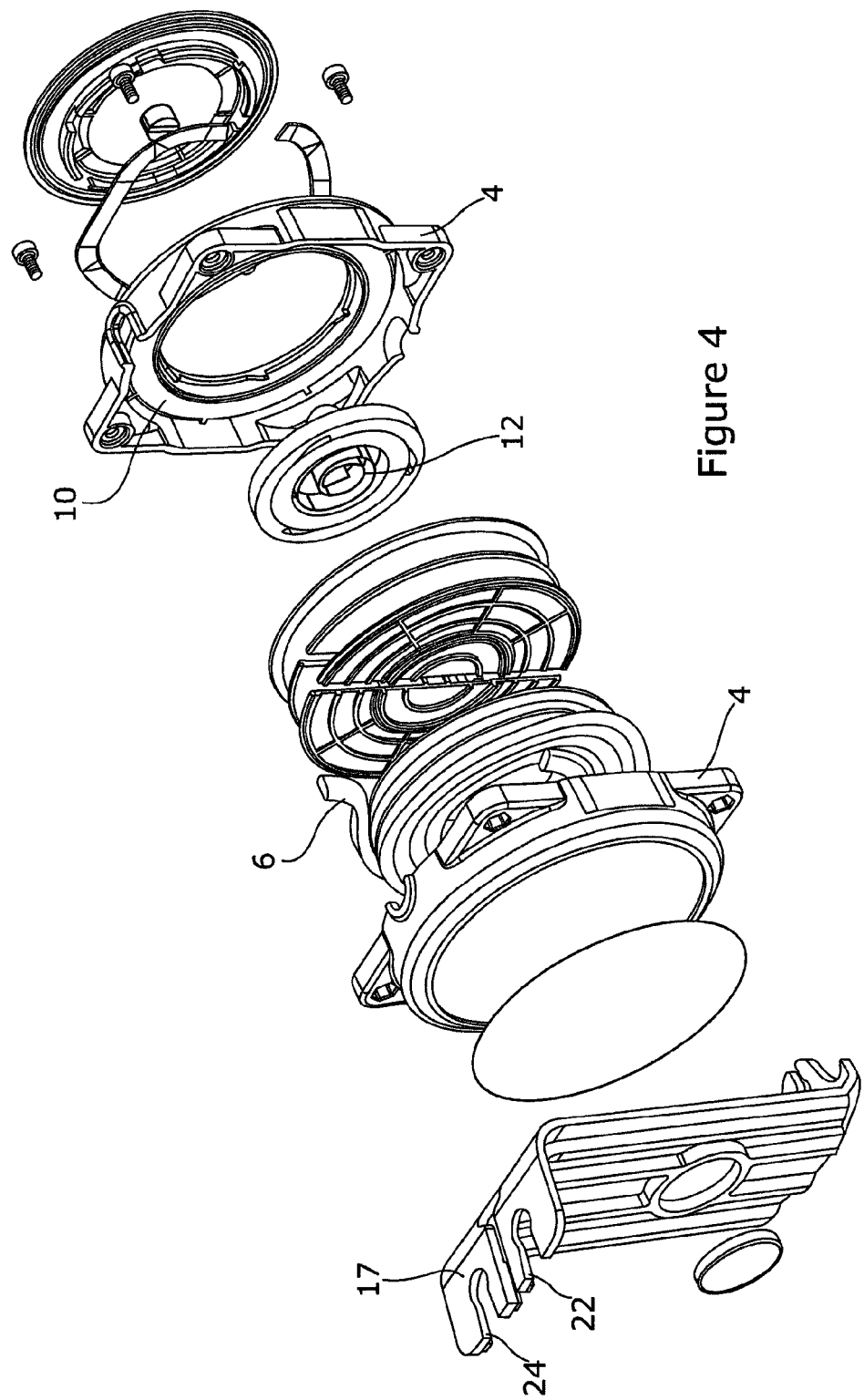
Figure 5:
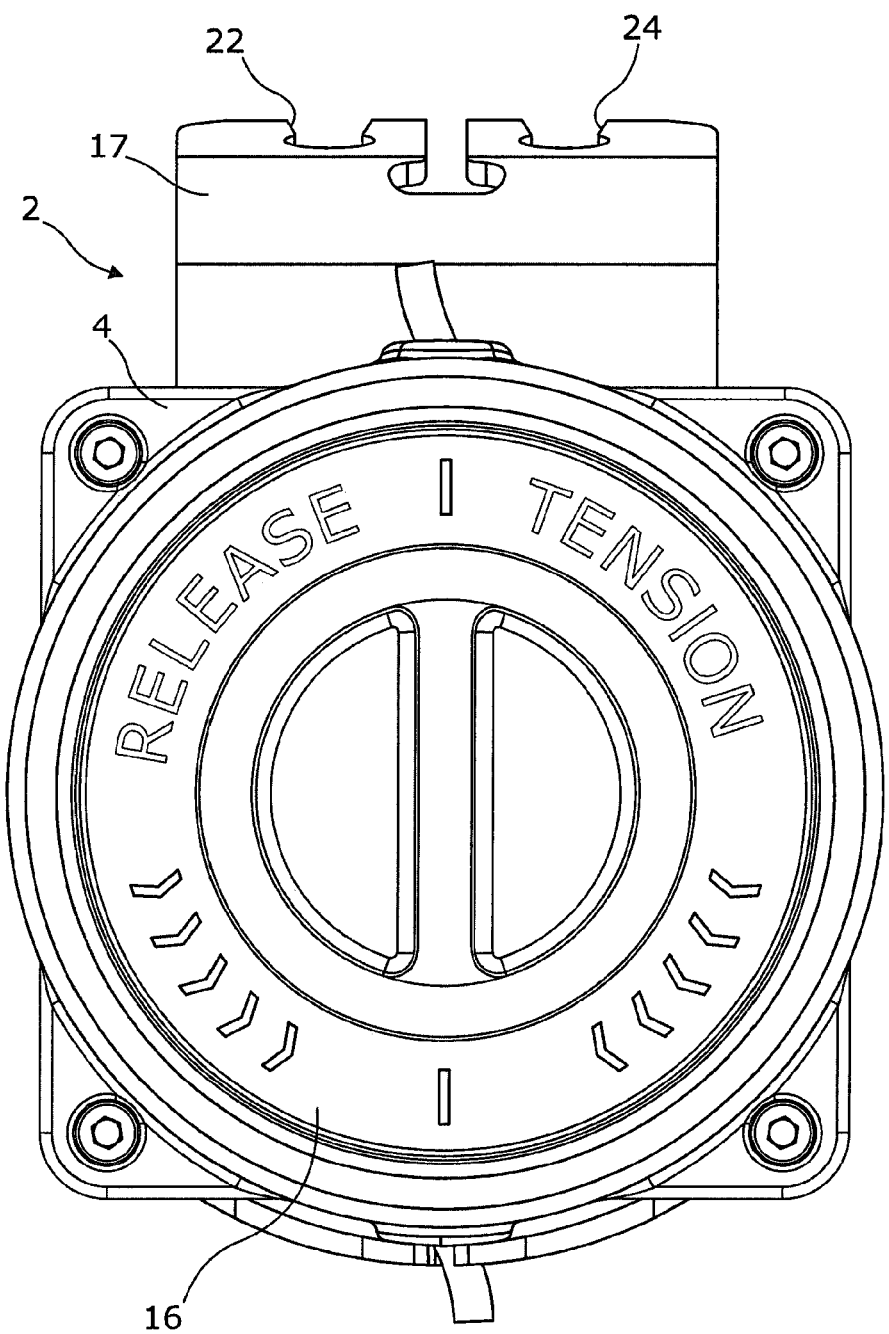
FIG. 5 shows a front elevation of the assembly of FIG. 1.
Figure 6:
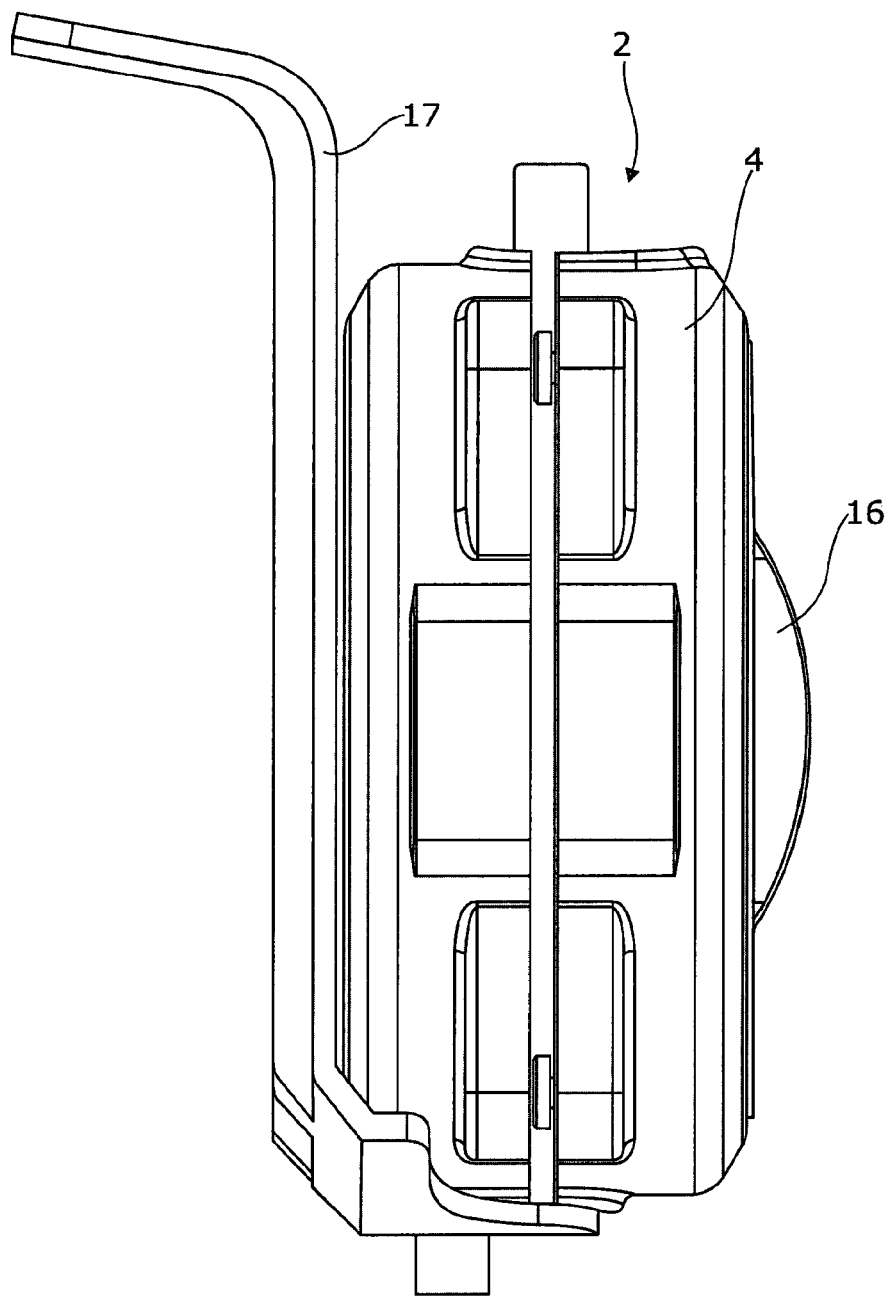
FIGS. 6 and 8 illustrates side elevations of the assembly in accordance with FIG. 1.
Figure 7:
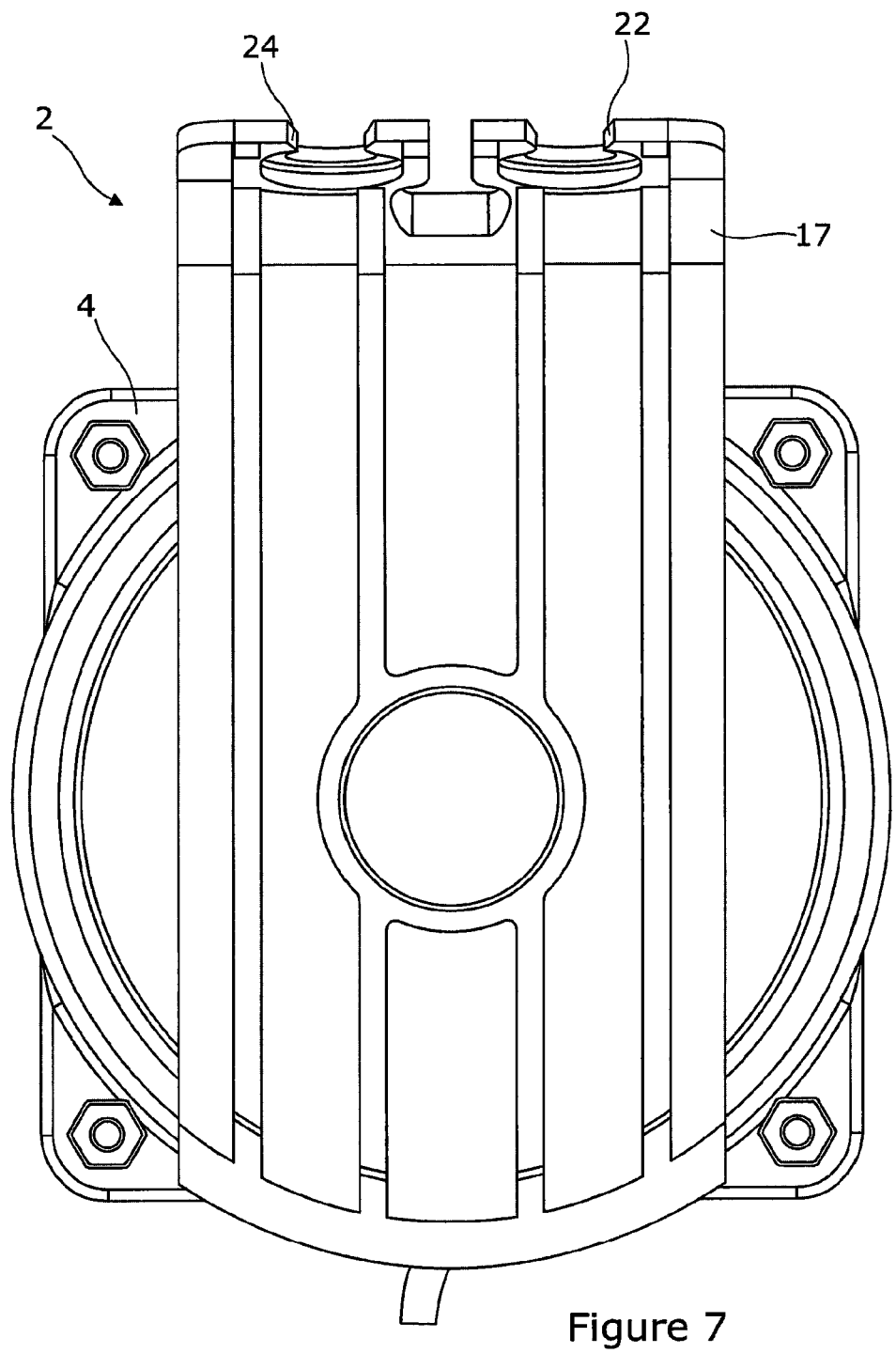
FIG. 7 illustrates a rear elevation of the assembly.
Figure 8:
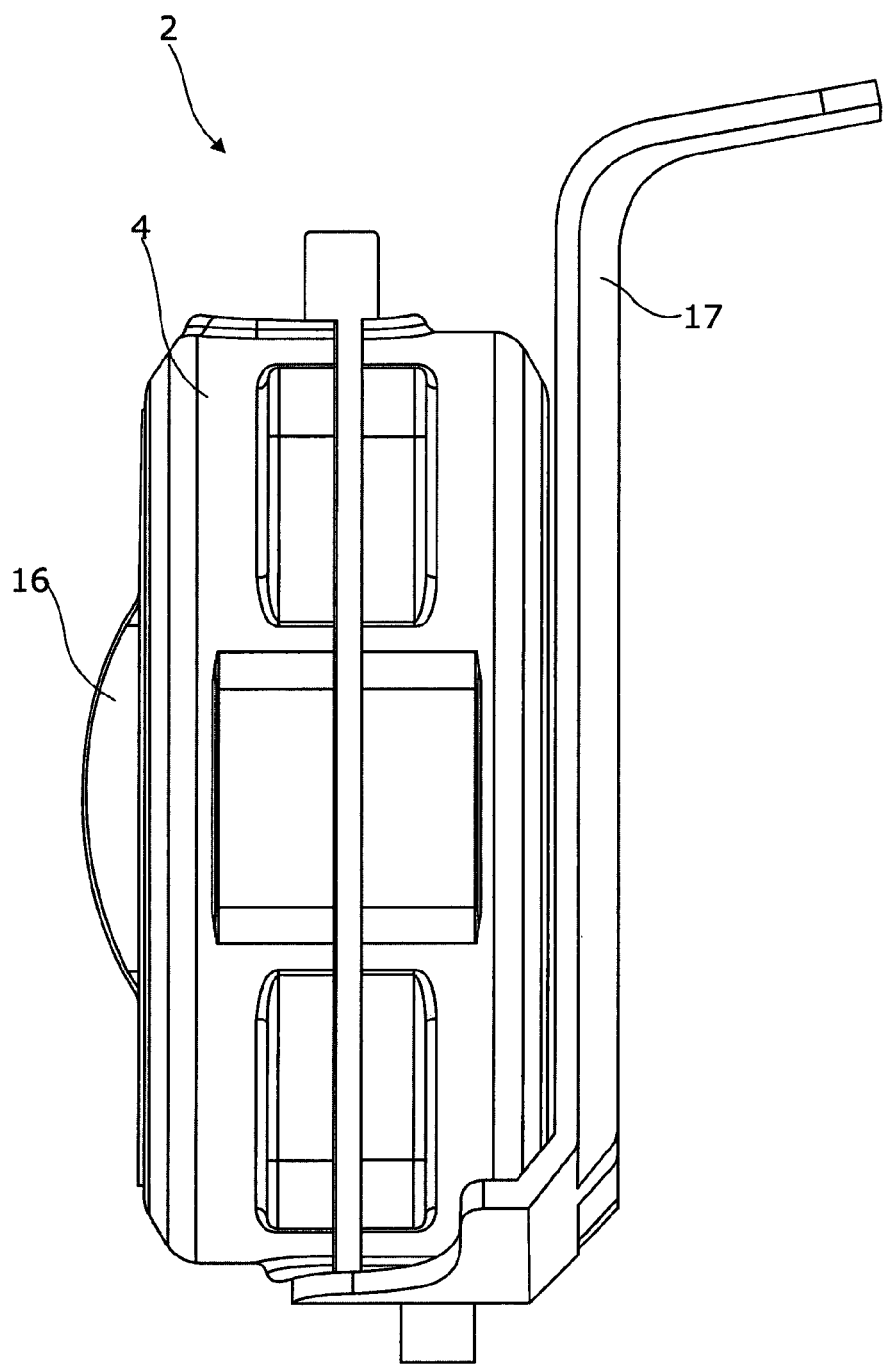
Figure 9:
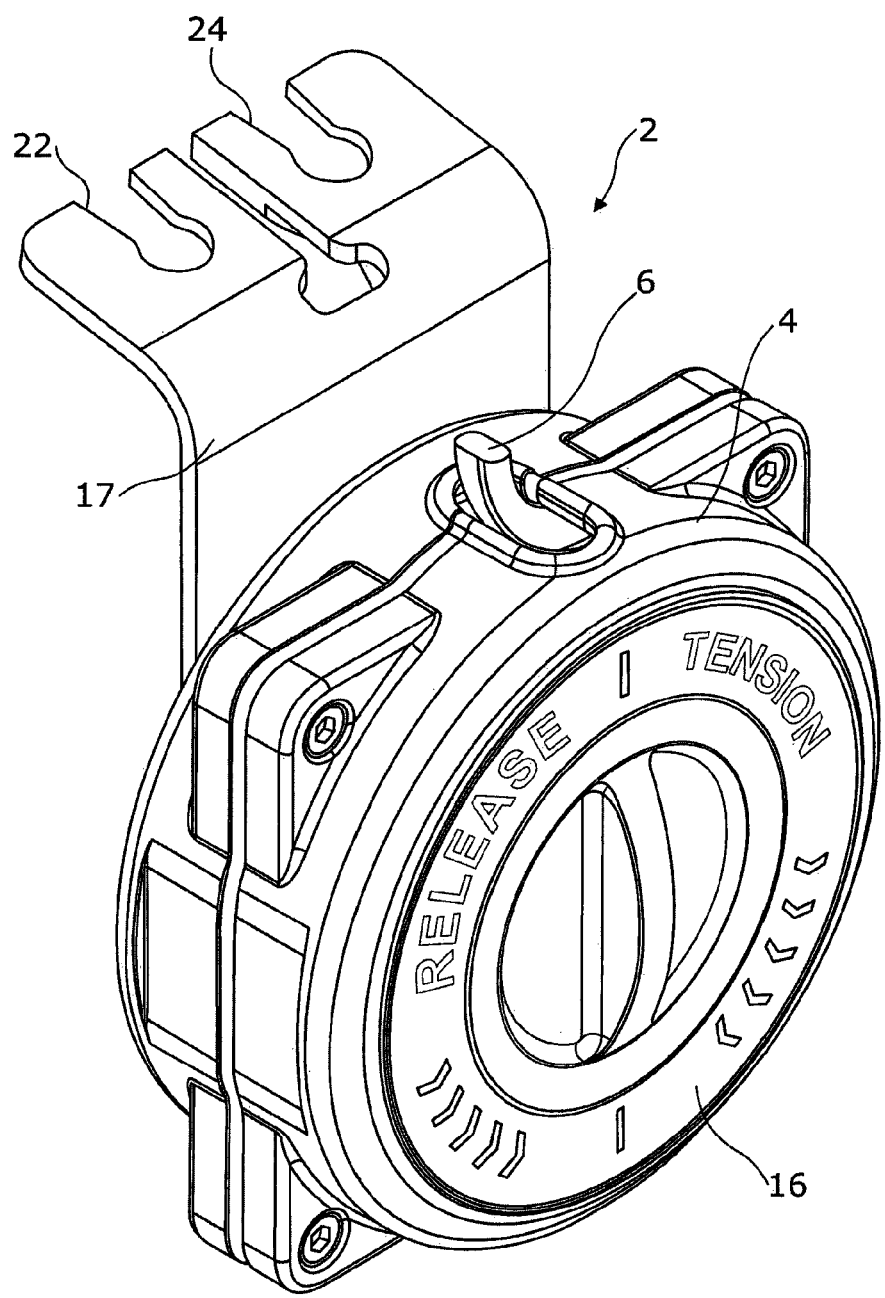
Figure 10A:
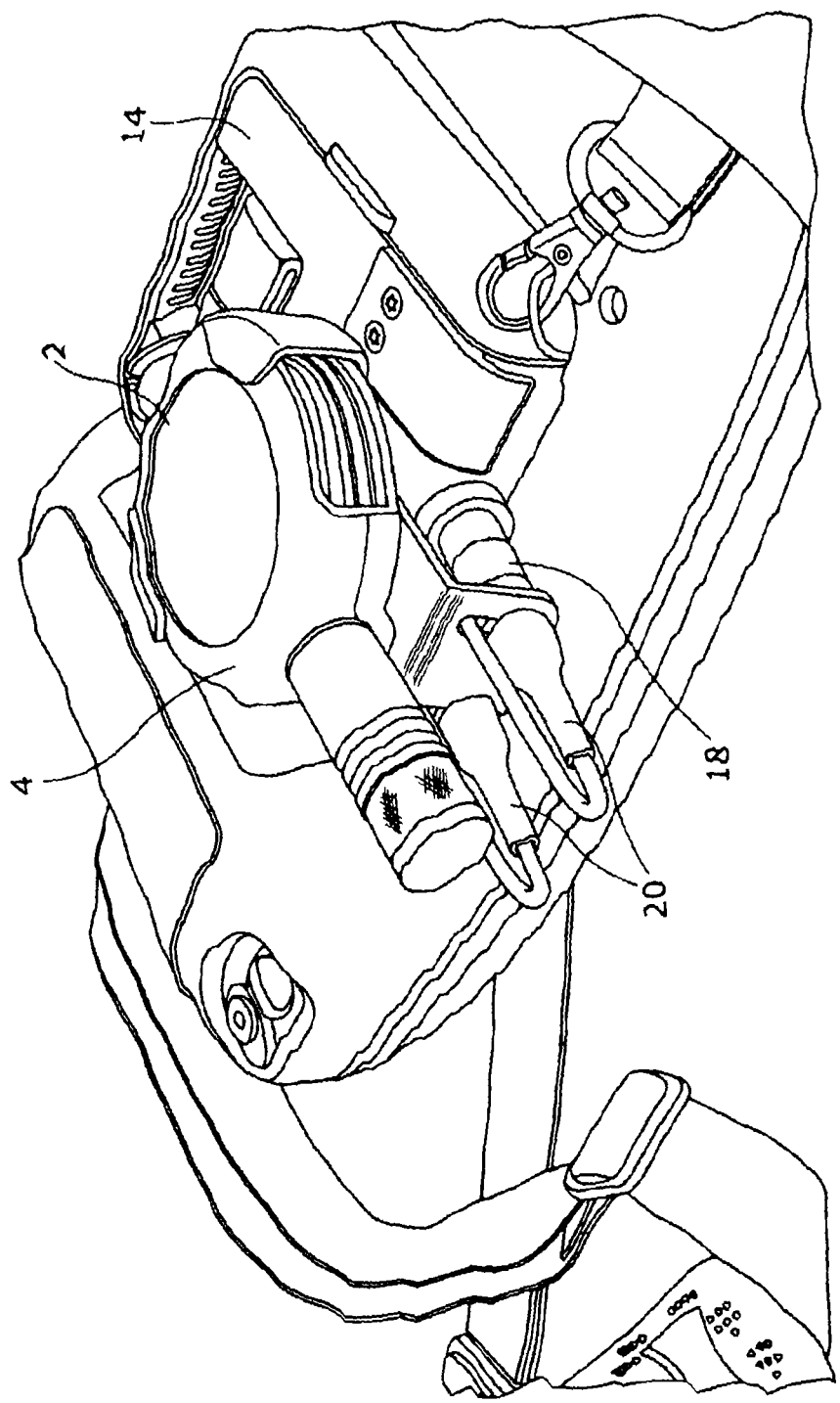
FIGS. 10a-d show various embodiments of the assembly in attachment with the base unit.
Figure 10B:
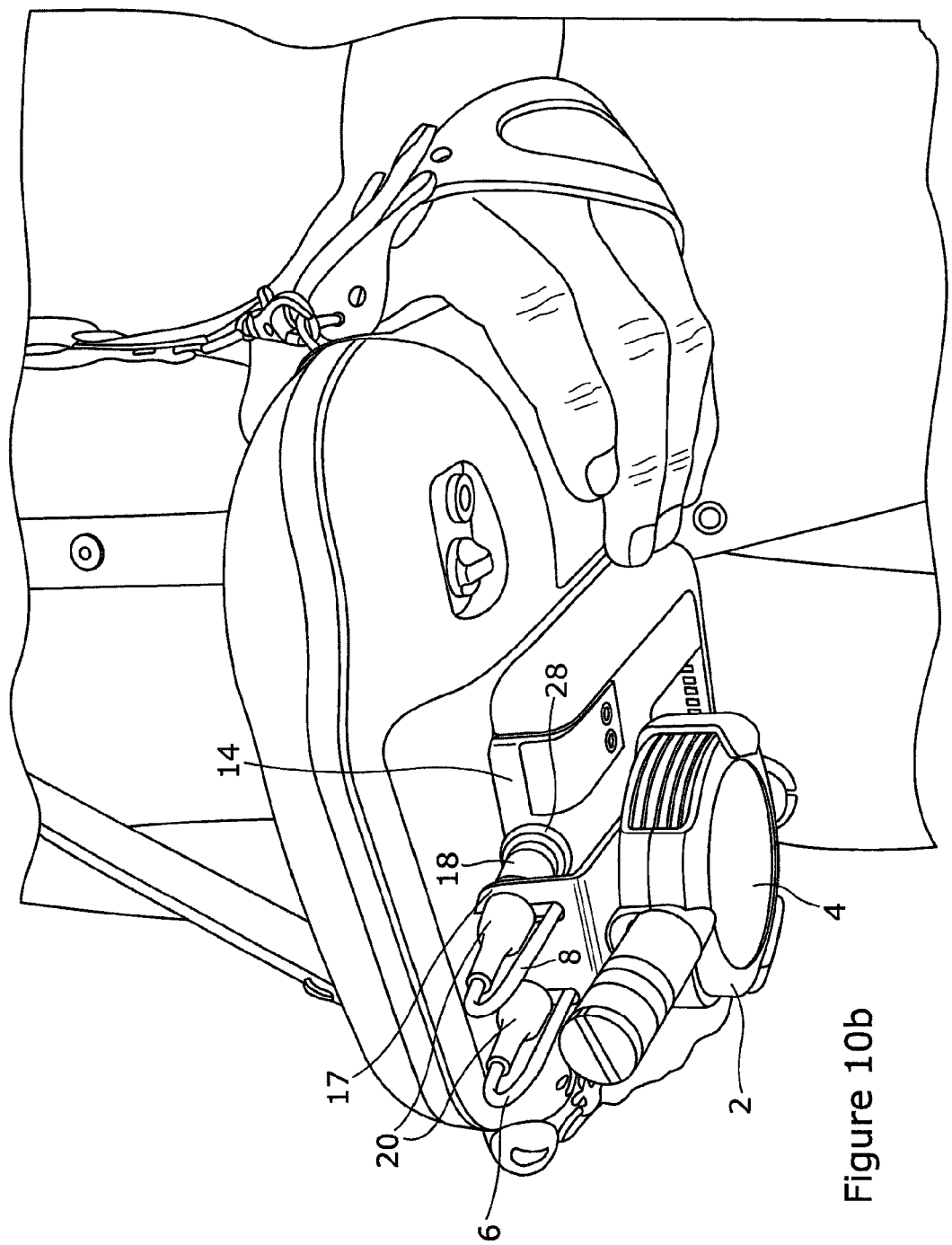
Figures 10C, 10D:
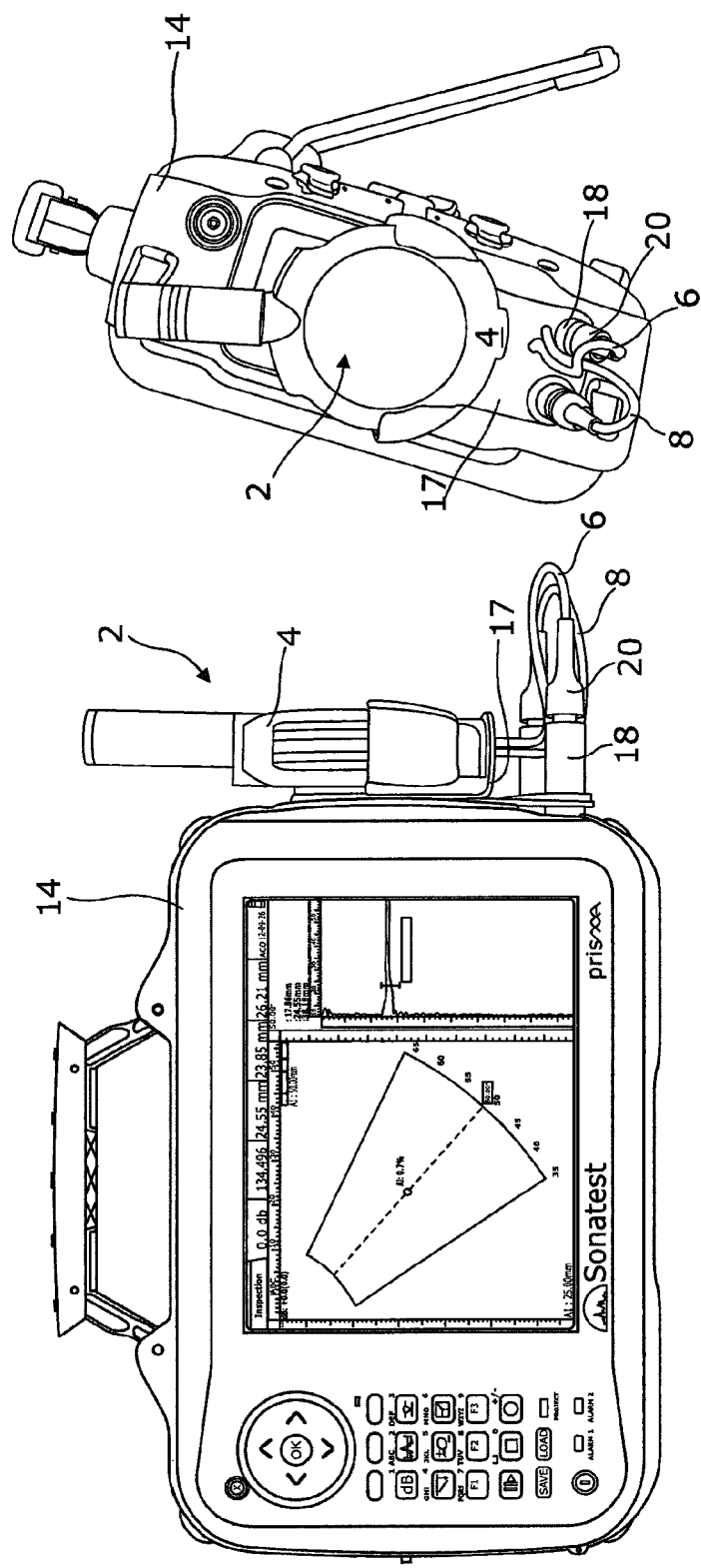

The Figures illustrate a spool assembly 2 in accordance with one embodiment of the invention. The assembly in accordance with the invention includes a body or housing portion 4 and a holder around which the lead cables 6,8 are wound in order to allow the same to be held within the body when in a storage condition. The body has an inner cavity 10 in which the lead cables can be stored and biasing means, typically a spring 12 are provided to bias the lead cables to be wound into a storage position by rotation of the holder with respect to the housing/body portion. This occurs when the assembly is in a second mode of operation. The spool assembly 2 can be attached for use to a base unit 14 as shown in FIG. 10a-d.

When in the first mode, which, in this embodiment, can be selected by movement of the front plate 16 of the assembly by the user, the mechanism of the assembly can be used and moved by manually rotating the holder to introduce the lead cables 6, 8 into the cavity 10 so that when in the first mode the cables can be wholly wound around the holder and the holder is effectively positioned intermediate the opposing ends of the cables. This allows the user to introduce their set of lead cables 6,8 to the spool assembly and therefore allows the same to be retrofitted to the spool assembly and used with the assembly. The spool assembly can be moved to the second mode as described above in which the lead cables can be selectively extended from the body so as to allow the free ends of the lead cables to be moved to the location of use and extended the required distance from the unit with, typically equal length portions of the lead cables extending from a first side of the spool assembly to a first end of the lead cables and from a second side of the spool assembly to a second end of the lead cables.

The body portion is in one embodiment attached to location means 17 which engage with the connectors 18 in this case provided as plugs 20 at the opposing end of the lead cables from the free end. The location means has slots 22, 24 to thereby locate the connectors in the appropriate location for connection to the respective sockets 26,28 of the base unit. The spacing between the slots 22,24 can in this embodiment be adjusted to allow the assembly to be range taking and allow the assembly to be used in conjunction with different designs of base unit.

In this embodiment the location means are provided as part of engagement means 30 which are provided to allow the assembly to be attached to the base unit. However it should be appreciated that in another embodiment the assembly can be formed integrally with the base unit.

Figure 11:
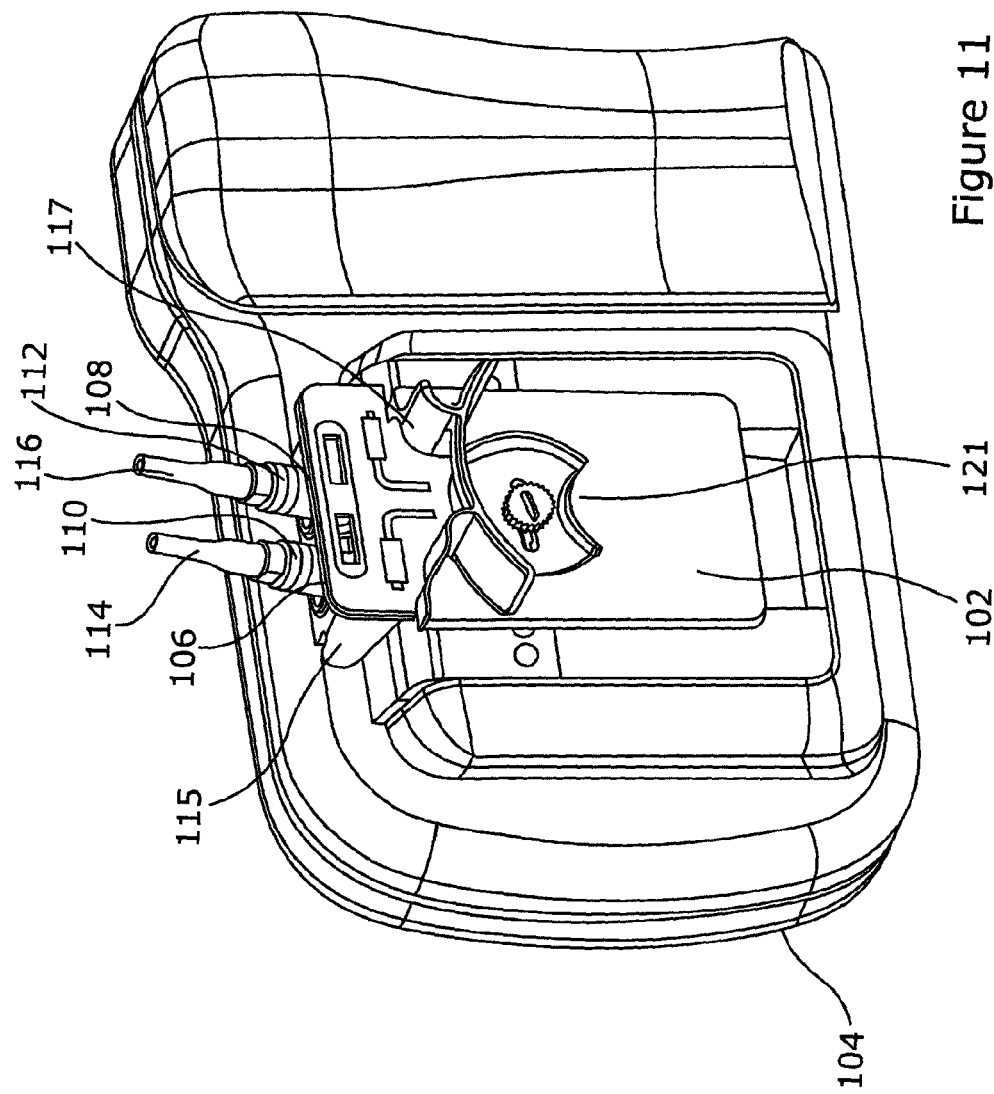
FIGS. 11-17 illustrate a further embodiment of the apparatus in accordance with the invention.

Referring now to FIGS. 11-17 there is illustrated a further embodiment of the invention in accordance with this application. As shown in FIG. 11, there is provided monitoring apparatus 104 which may be ultrasonic monitoring apparatus. The monitoring apparatus includes or is connected with a bracket 102 which can be fitted into position onto the monitoring apparatus 104. The monitoring apparatus has first and second sockets 106 108 which are provided to receive therein the connecting plugs 110, 112 respectively and the connecting plugs are connected to the end of respective cables 114, 116, the ends of which are shown in FIG. 11. The cables are then passed through a tension controlling path 115,117 for each of the cables 114, 116 respectively and then lead to the location 121 at which the spool assembly 122 will be located. By passing the cable ends through the tension controlling paths 115,117 before connecting with the sockets 106,108 then any movement of the cables or the spool assembly has no or a reduced impact on the connection plugs 110,112 when located in the sockets. This therefore avoids the possibility of the connection plugs being separated from the cables during and following prolonged use of the apparatus.

The spool assembly 122, in this embodiment is separate to the monitoring apparatus 104 and can be selectively placed in position therewith via an engagement means which, in this embodiment, is by magnets which are provided on the bracket 102 and on the housing of the spool.

Thus it will be appreciated that the bracket can be provided permanently mounted on the housing at the time of purchase of the housing or alternatively, may be retrofitted to the housing. In one embodiment, a range of brackets are available and the brackets are provided with the appropriate location means to allow the same to be located with a particular type of monitoring apparatus. Thus, the apparatus in accordance with the invention is range taking inasmuch that it can be adapted, by the selection of the suitable bracket, to allow the same to be used with different types and shapes of ultrasonic monitoring apparatus, and indeed other forms of apparatus with which lead cables are of use.

Figure 12:
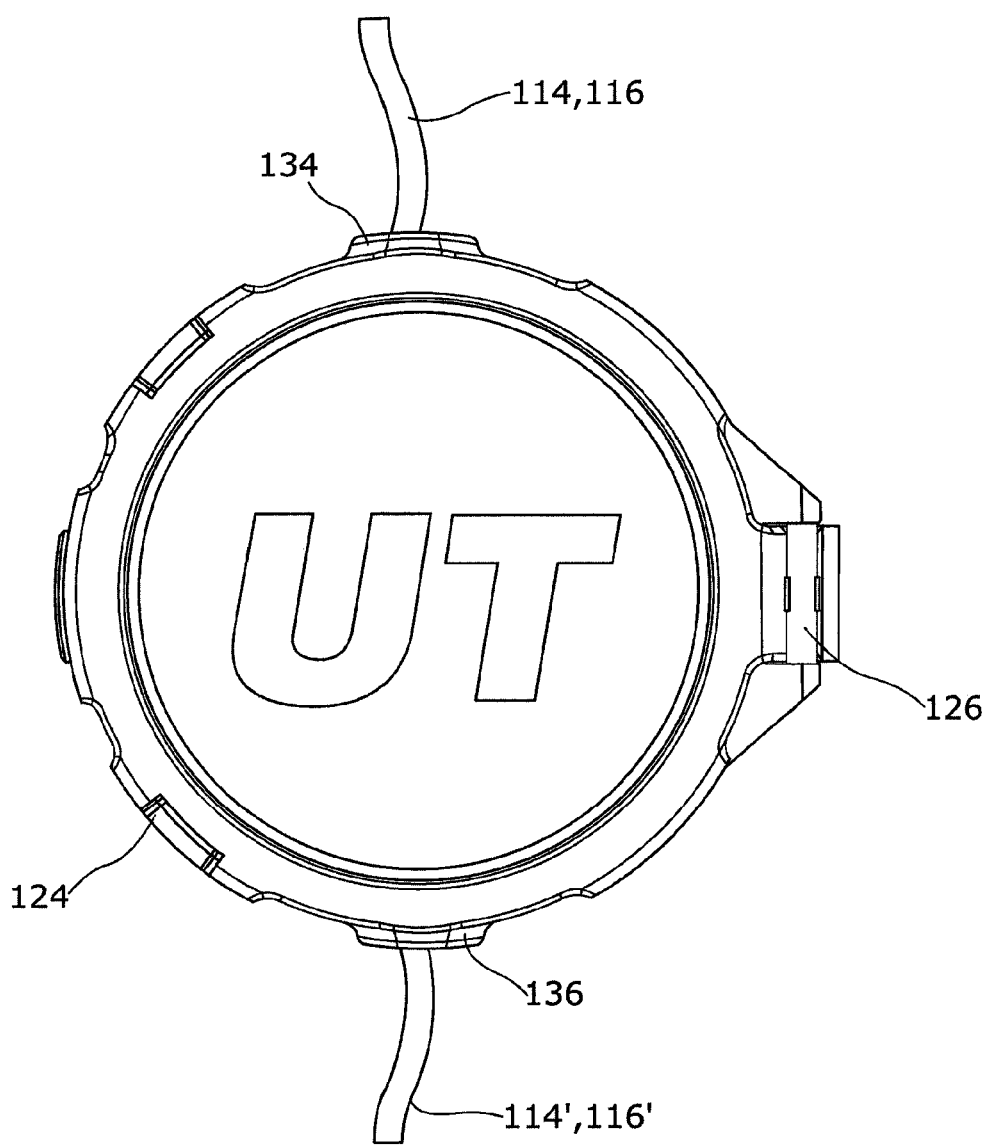
Figure 13:
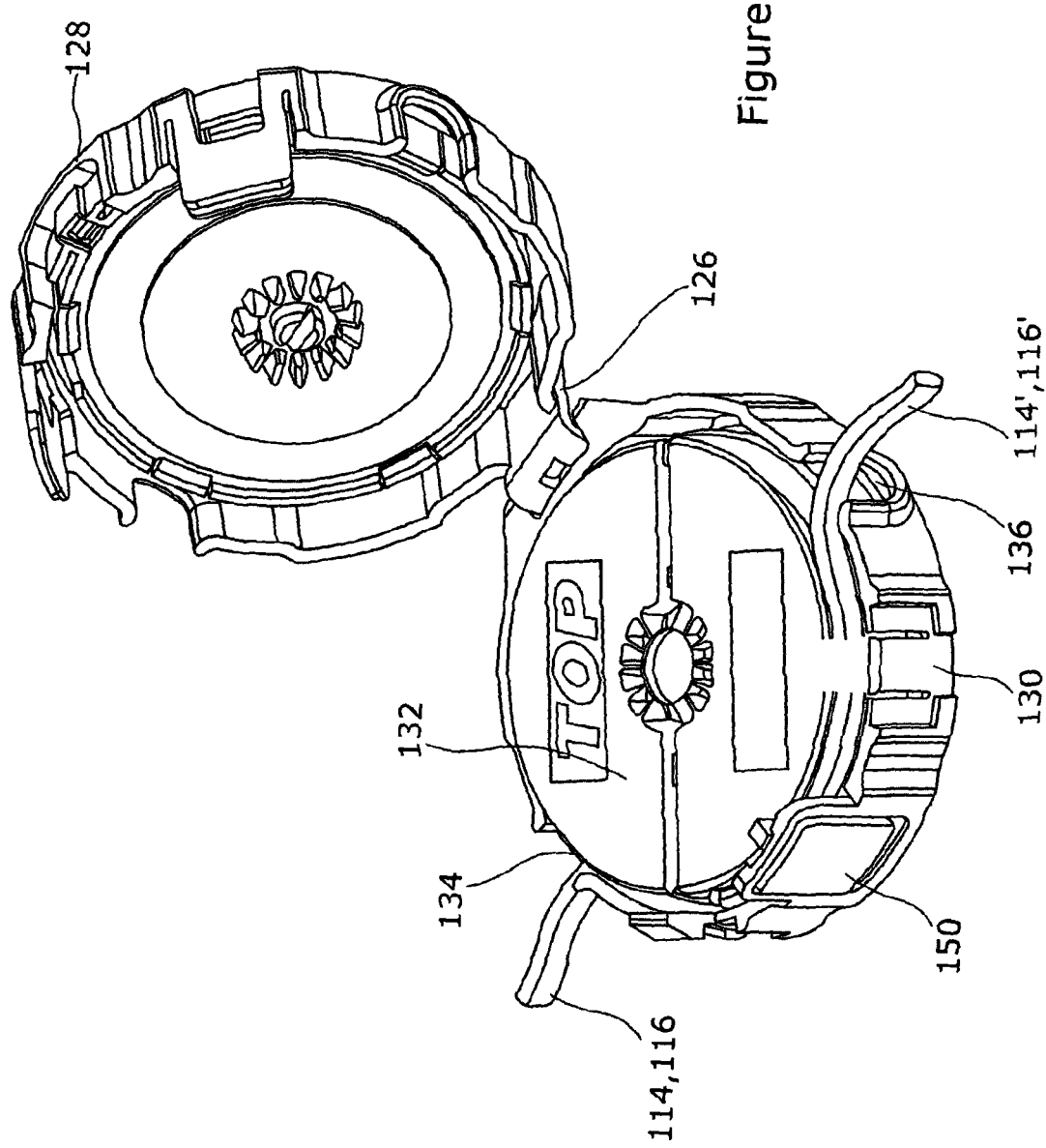
Figure 14:
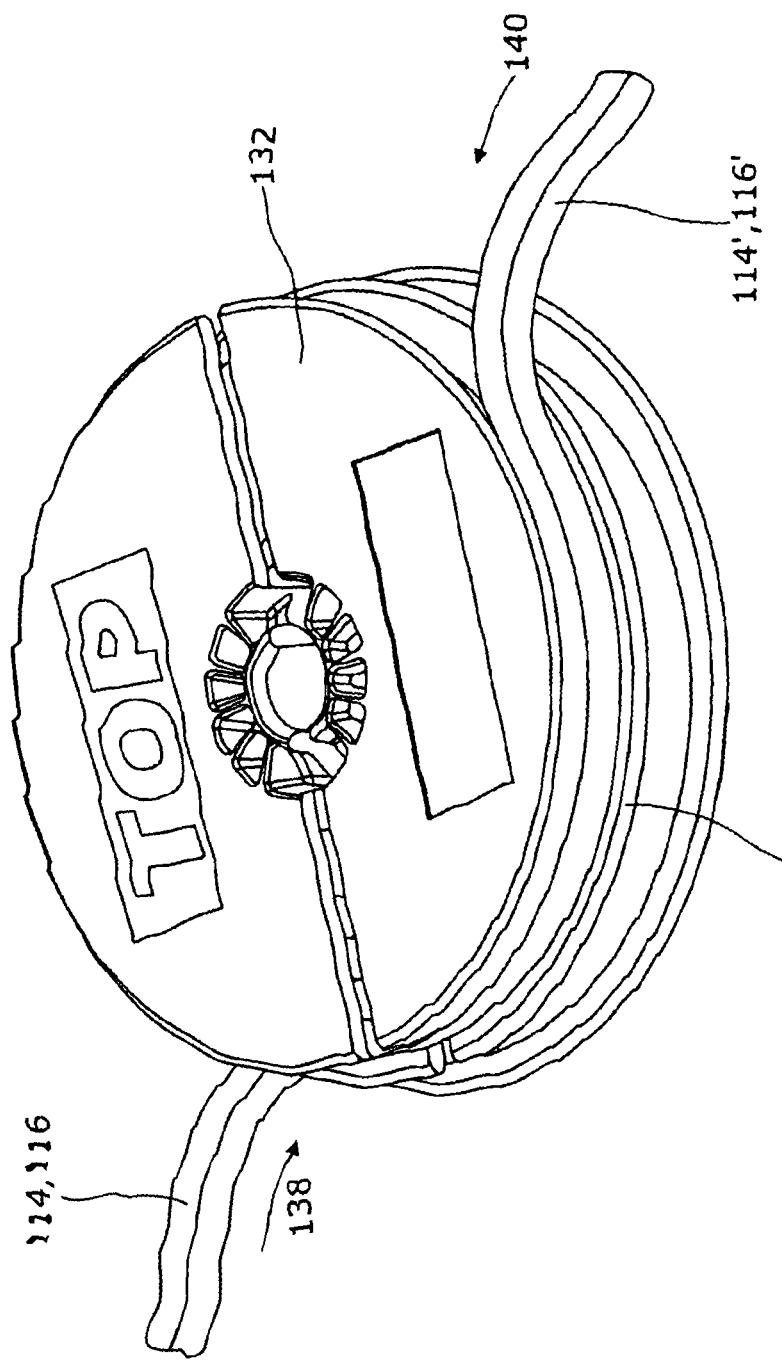

Referring now to the FIGS. 12-17, there is shown the detail of the spool in various views. In FIG. 12, there is shown the manner in which there is provided a housing 124 which is hingeably connected 126 at one end 122 so as to allow two parts 128,130 of the housing 124 to be moved between the position shown in FIG. 12 in which the same is ready for use and an open position as shown in FIG. 13 in which the two parts 128, 130 are pivotally moved apart to expose the holder 132 on which the cables 114, 116 are wound.

As shown in FIG. 12, the housing includes two ports 134,136 which are provided at opposing sides of the housing 124. In this embodiment, from port 134, portions of the first and second cables 114,116 pass therethrough and are connected at their free ends to the connectors 110,112 which are engaged in the housing sockets 106,108. On the opposing side, portions 114', 116' of the cables pass from the spool assembly towards the monitoring sensor connections at the opposing ends of the cables. As shown the cables 114, 116 are joined together along at least most of their length to form a unitary elongate member and then can be separated at their respective connection or monitoring ends.

Thus it is shown that the spool assembly is located intermediate to the ends of the cables and the cables extend from the housing in both directions when it is desired that the same are extended and made available for use and then retract from both sides into the spool assembly as the holder 132 rotates with respect to the housing 124 when the spool is being moved to a storage condition as indicated by arrows 138, 140.

Figure 15:
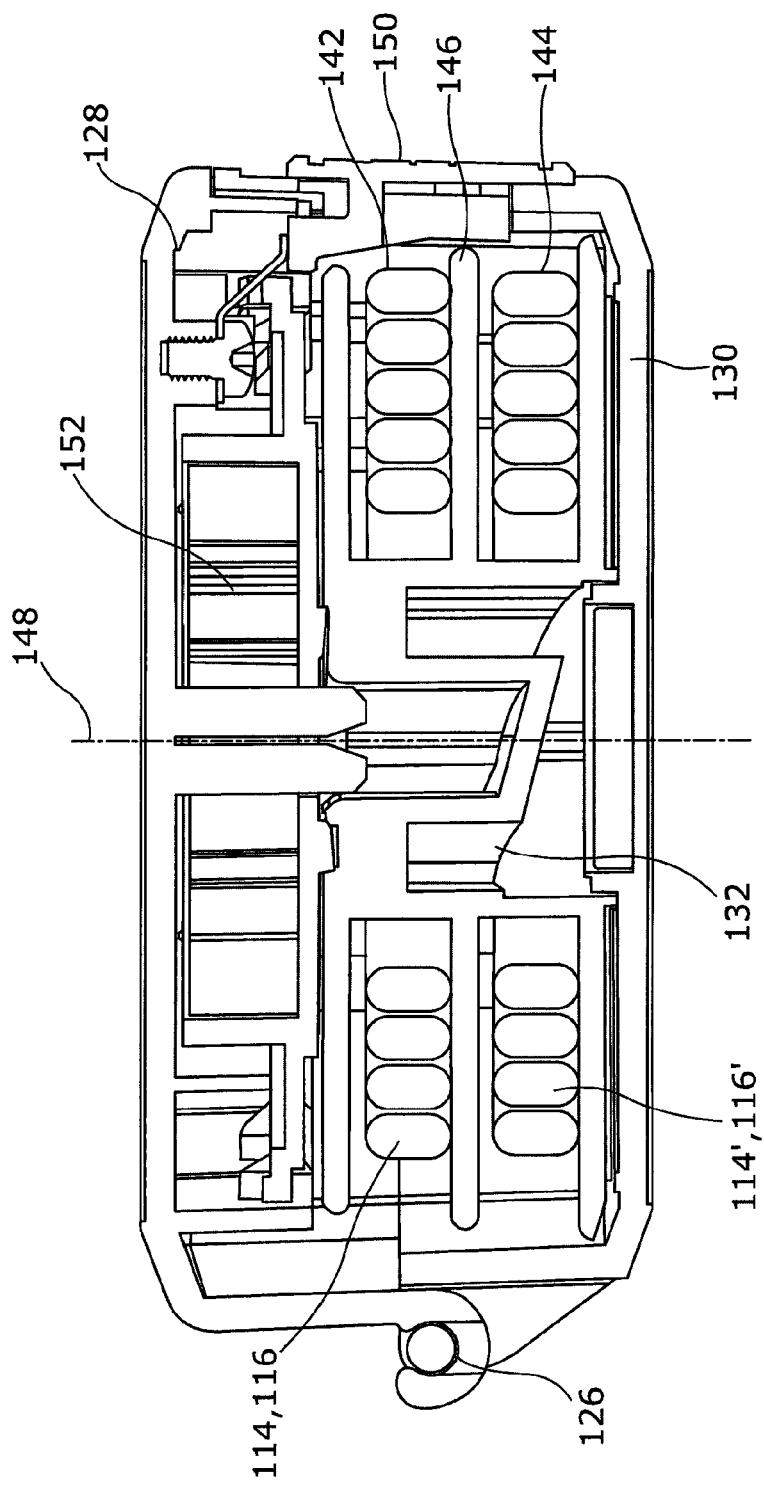
Figure 16:
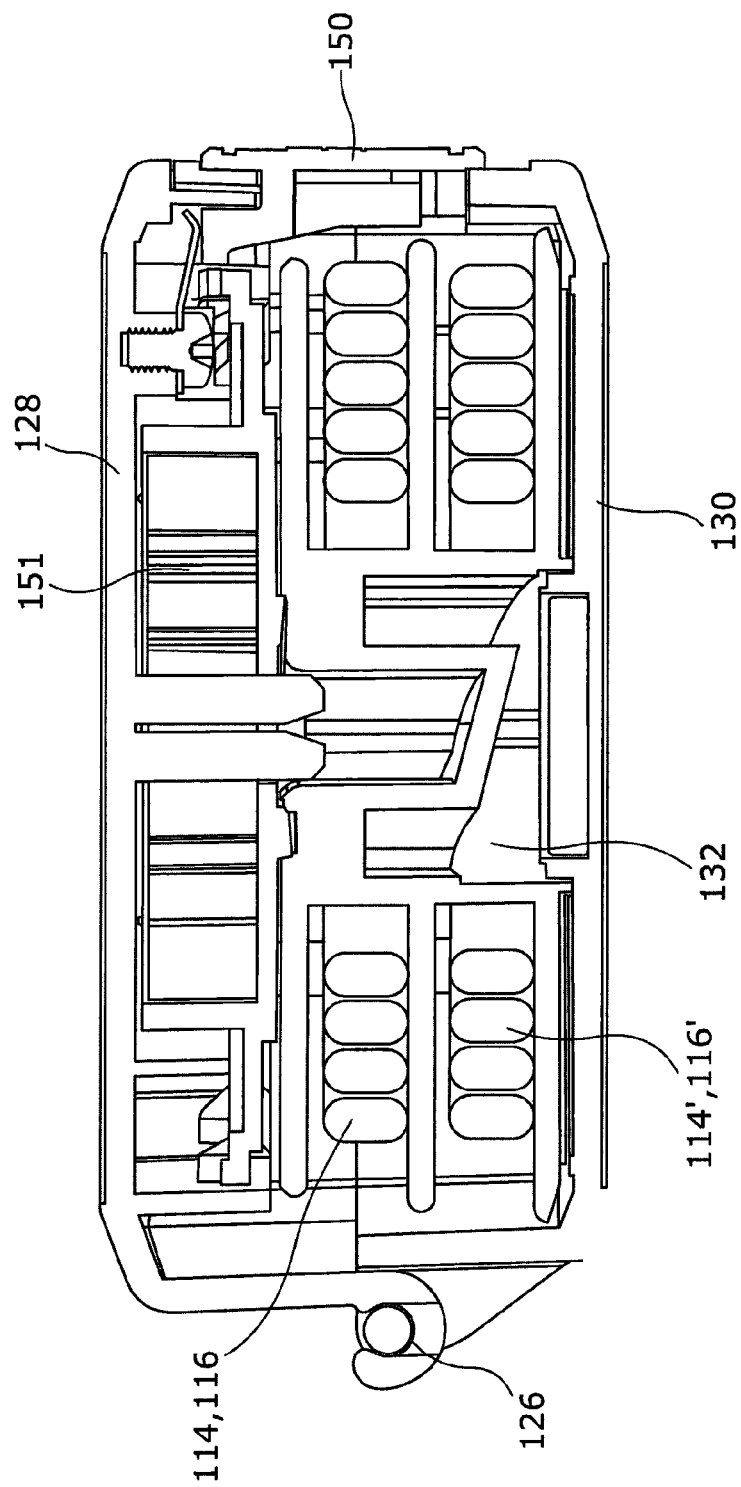
Figure 17:
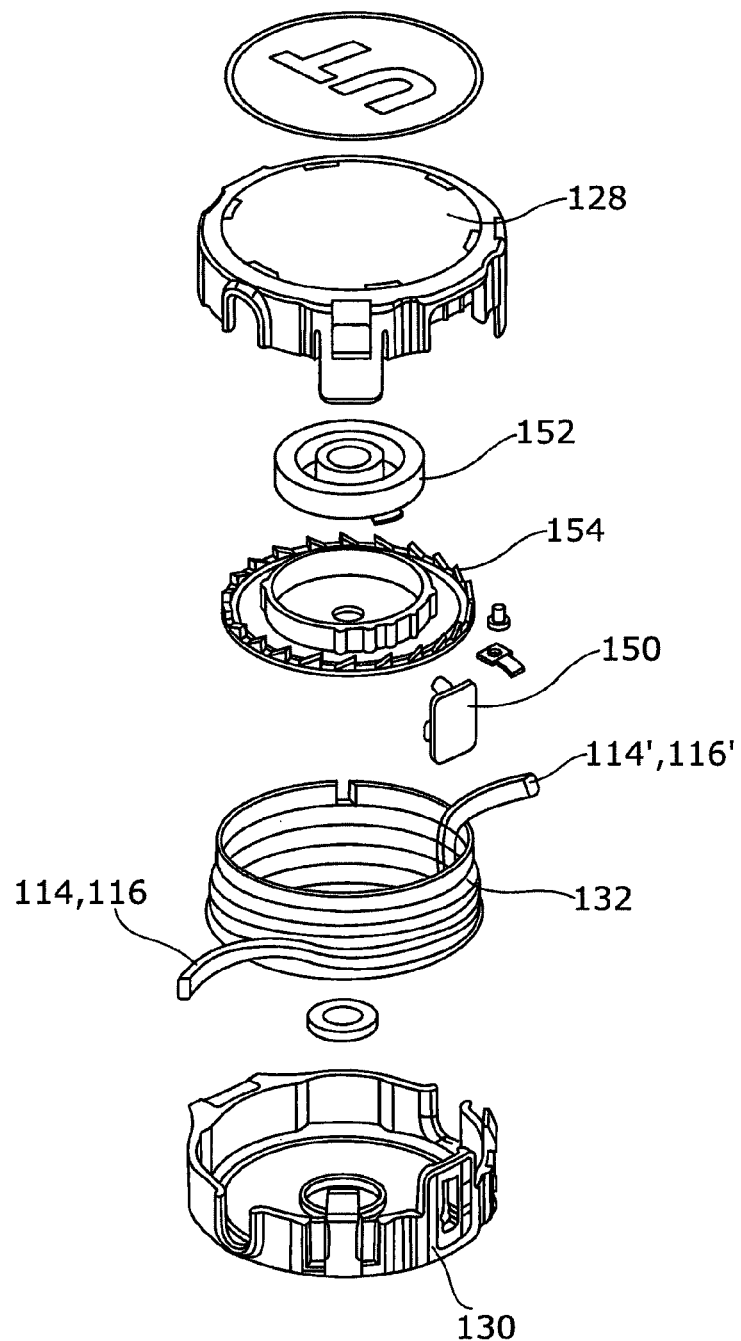

The cables are typically wound around two paths 142, 144 separated by an intermediate wall 146 of the holder 132 in opposite directions such that when the holder 132 rotates with respect to the housing about axis 148, the cables either extend from or retract into the same. There is provided on the housing a locking switch 150 which can be moved by the user between a first position as shown in FIG. 15 and a second position as shown in FIG. 16 and when in the second position, the movement of the cables 114, 116 into and from the housing by rotation of the holder is possible and a spring 152 which is mounted about the central axis 148 is free to exert a biasing force on the holder 132 and as the locking teeth 154 are disengaged the holder is free to rotate under the influence of the spring so that the holder rotates in a direction to bias the cables 114,116 back into the holder and hence the spool assembly when desired. When the switch 150 is in the first position, the tension applied by the spring is prevented from causing rotation of the holder by the engagement of the teeth 154 with the holder 132 so that no biasing force is applied. Also, when the apparatus is in this condition the holder 132, with the cables wound thereon by the user, can be introduced into the housing at the start of use of the apparatus and therefore allows the user to wind their own cables onto the holder and hence be used with the spool assembly and the advantages to be obtained.

By allowing the cable to be loaded onto the holder by the user, then the spool can be provided in two forms. In a first form, the spool assembly can be provided preloaded with the cables and connectors and thereby sold as a retail unit. Alternatively, and in order to allow the spool to be retrofitted and used with existing cables or for the user to select different cable types and still obtain the advantages, the spool assembly can be provided with the holder 132 empty at the time of purchase and then the user is able to wind their own cables 114,116 around the holder paths 142, 144 in a manner which is instructed and then place the same into the housing and during this stage, the tension effect of the spring is prevented by the position of the locking switch so that there is no possibility of the components of the same from being biased to leave the holder as soon as it is opened.

The invention claimed is:

1. An electrical monitoring apparatus to allow the integrity of an assembly or a unitary member to be tested, said apparatus comprising:
   a base unit;
   at least first and second lead cables connected thereto to provide data from sensors at one end of the cables to the base unit via connectors at the opposing ends of the cables; and
   a spool assembly in which is located at least one holder about which the said lead cables are at least partially wound for storage and extended therefrom as required for use of the apparatus,
   wherein a first portion of each of said lead cables which includes the end with the sensor extends from said spool assembly and a second portion of each of the said lead cables which includes the said connector extends from said spool assembly such that said spool assembly is located intermediate the ends of each of said lead cables,
   wherein the lead cables are wound about the at least one holder configured to simultaneously extend and retract the first portions and the second portions of said cable ends and
   wherein at least part of the first portion of the lead cables is wrapped around a holder, and at least part of the second portion of the lead cables is wrapped around a holder,
   wherein location means are provided for the spool assembly on the apparatus base unit to allow the spool assembly to be selectively fitted on the base unit, said location means including slots to thereby locate the said connectors in the appropriate location for connection to respective sockets of the base unit to allow said data from the sensors to pass to the base unit.

2. The apparatus according to claim 1 wherein the assembly is operable in a first mode of operation in which the lead cables are wound with the assembly and a second mode of operation in which the lead cables can be selectively extended from the assembly.

3. The apparatus according to claim 2 wherein the particular mode of operation of the assembly is selected by the user of the assembly by altering the condition of actuation means.

4. The apparatus according to claim 2 wherein the first mode is used at the time of locating the lead cables with the said assembly prior to use of the lead cables with the assembly.

5. The apparatus according to claim 1 wherein the lead cables are biased to be retractable into the said assembly.

6. The apparatus according to claim 5 wherein the lead cables are biased to retract into the assembly by a spring mounted in the housing acting on a holder on which the cables are wound.

7. The apparatus according to claim 1 wherein each of the lead cables includes a connector.

8. The apparatus according to claim 7 wherein a tension control means is provided intermediate the spool assembly and the connection with the apparatus and through which the said cables pass.

9. The apparatus according to claim 1 wherein the spool assembly is provided as an integral part of the base unit.

10. The apparatus according to claim 1 wherein the spool assembly is provided with engagement means which allow the assembly to be selectively fitted to the base unit.

11. The apparatus according to claim 1 wherein the base unit is ultrasonic testing apparatus.

12. The apparatus of claim 1 wherein the first portions extend from a first side of said spool assembly and the second portions extend from the opposite side of said spool assembly.

13. The apparatus of claim 12 wherein said spool assembly includes a housing containing the holder, and the first and second portions extend from the housing.

14. The apparatus of claim 1 wherein the first and second portions are wound around the same holder, the first portions being wound around the holder in the same direction as the direction in which the second portions are wound around the holder.

15. The apparatus of claim 1 wherein the spacing between the slots is adjustable.

16. The apparatus of claim 1 wherein the apparatus includes tension controlling paths along which the respective cables pass and said tension controlling paths are located intermediate said spool assembly and the said sockets on the base unit.

17. The apparatus of claim 1 wherein the slots extend parallel to the axis of the spool.

18. A spool assembly comprising:
   one or more lead cables located therein; and
   an at least one holder,
   said assembly allowing the lead cables to be partially wound therein and extended therefrom as required for use and the spool assembly being operable in a first mode to allow the one or more lead cables to be wound onto the at least one holder and a second mode in which the one or more cables are biased to at least partially retract into said assembly about the at least one holder,
   wherein a first portion of each of said one or more lead cables includes an end with a sensor and extends from a first side of said housing and a second portion of each of said one or more lead cables includes an end with a connector and extends from a second side of said housing which opposes the first side such that said spool assembly is located intermediate the ends of said one or more lead cables,
   wherein at least part of the first portions of the one or more lead cables is wrapped around the holder, and at least part of the second portions of the one or more lead cables is wrapped around the holder
   wherein said assembly includes location means for the spool assembly to allow the spool assembly to be selectively fitted to a base unit, said location means including slots to thereby locate the said connectors in the appropriate location for connection to the base unit to allow data from the sensors to pass to the base unit.

19. An assembly according to claim 18 wherein there is provided a user actuable locking switch which allows the spool assembly to be selectively moved by the user between the two modes of operation by selective operation thereof.

* * * * *